United States Patent
Tucker et al.

(10) Patent No.: US 12,252,596 B2
(45) Date of Patent: Mar. 18, 2025

(54) GLASS-REINFORCED FLUOROPOLYMER COMPOSITIONS

(71) Applicant: AGC CHEMICALS AMERICAS, INC., Exton, PA (US)

(72) Inventors: Ryan T. Tucker, Newtown Square, PA (US); Katherine M. Sprick, Kennett Square, PA (US)

(73) Assignee: AGC CHEMICALS AMERICAS, INC., Exton, PA (US)

( * ) Notice: Subject to any disclaimer, the term of this patent is extended or adjusted under 35 U.S.C. 154(b) by 541 days.

(21) Appl. No.: 17/259,973

(22) PCT Filed: Jul. 22, 2019

(86) PCT No.: PCT/US2019/042761
§ 371 (c)(1),
(2) Date: Jan. 13, 2021

(87) PCT Pub. No.: WO2020/023347
PCT Pub. Date: Jan. 30, 2020

(65) Prior Publication Data
US 2021/0309813 A1 Oct. 7, 2021

Related U.S. Application Data

(60) Provisional application No. 62/701,952, filed on Jul. 23, 2018.

(51) Int. Cl.
*C08J 5/04* (2006.01)
*C08L 27/18* (2006.01)

(52) U.S. Cl.
CPC ............. *C08J 5/043* (2013.01); *C08L 27/18* (2013.01); *C08L 2205/02* (2013.01)

(58) Field of Classification Search
CPC ........... C08L 27/12; C08L 27/18; C08K 7/14
See application file for complete search history.

(56) References Cited

U.S. PATENT DOCUMENTS

| | | | |
|---|---|---|---|
| 4,863,794 A * | 9/1989 | Fujii | C23C 28/00 523/214 |
| 5,736,610 A | 4/1998 | Nishi et al. | |
| 7,019,079 B2 | 3/2006 | Sumi et al. | |
| 7,112,640 B2 | 9/2006 | Funaki et al. | |
| 9,388,009 B2 | 7/2016 | Nishi et al. | |
| 10,304,583 B2 | 5/2019 | Hosoda et al. | |
| 2003/0162923 A1 | 8/2003 | Funaki et al. | |
| 2004/0116606 A1 * | 6/2004 | Sumi | C08L 27/18 525/199 |
| 2006/0093827 A1 | 5/2006 | Funaki et al. | |
| 2013/0313774 A1 * | 11/2013 | Nishi | F04B 39/042 271/307 |
| 2014/0342155 A1 | 11/2014 | Abe et al. | |
| 2015/0184749 A1 * | 7/2015 | Fukasawa | B29C 59/14 277/500 |
| 2016/0068670 A1 | 3/2016 | Hosoda et al. | |
| 2017/0226389 A1 * | 8/2017 | Wang | C09J 127/12 |
| 2021/0079206 A1 * | 3/2021 | O'Brien | C08F 259/08 |

FOREIGN PATENT DOCUMENTS

| | | |
|---|---|---|
| EP | 1652865 A1 | 5/2006 |
| EP | 2645178 A1 | 10/2013 |
| JP | H0673043 A | 3/1994 |
| JP | 2004277689 A | 10/2004 |
| JP | 2007084780 A | 4/2007 |
| JP | 2009252719 A | 10/2009 |
| JP | 2012112448 A | 6/2012 |
| JP | 2014224249 A | 12/2014 |
| WO | 2008010470 A1 | 1/2008 |
| WO | 2010017450 A1 | 2/2010 |
| WO | 2012070401 A1 | 5/2012 |
| WO | 2014189017 A1 | 11/2014 |

(Continued)

OTHER PUBLICATIONS

AGC, "Adhesive Fluon PFA EA-2000 Resin Allows One-Step Processing", https://www.agcchem.com/news/2017/september-15-2017-adhesive-fluon-pfa-ea-2000-resin-allows-one-step-processing/, Sep. 15, 2017, 2 pages.

International Search Report for Application No. PCT/US2019/042761 dated Sep. 26, 2019, 3 pages.

English language abstract and machine-assisted English translation for JPH 06-73043 extracted from espacenet.com database on Feb. 1, 2021, 7 pages.

English language abstract and machine-assisted English translation for JP 2004-277689 extracted from espacenet.com database on Feb. 1, 2021, 8 pages.

English language abstract and machine-assisted English translation for JP 2007-084780 extracted from espacenet.com database on Feb. 1, 2021, 17 pages.

(Continued)

*Primary Examiner* — Katarzyna I Kolb
(74) *Attorney, Agent, or Firm* — Howard & Howard Attorneys PLLC

(57) ABSTRACT

A glass-reinforced fluoropolymer composition has increased flexural strength and includes a first fluoropolymer, a second fluoropolymer, and glass fibers. The first fluoropolymer is present in an amount of from 60 to 99 parts by weight per 100 parts by weight of the glass-reinforced fluoropolymer composition. The second fluoropolymer is chosen from (1) a carboxy- and/or anhydride-functionalized perfluoroalkoxy copolymer, (2) a carboxy- and/or anhydride-functionalized poly(ethylene-co-tetrafluoroethylene) copolymer, and (3) combinations thereof. The second fluoropolymer is present in an amount of from 0.5 to 39.5 parts by weight per 100 parts by weight of the glass-reinforced fluoropolymer composition. The glass fibers are present in an amount of from 0.5 to 39.5 parts by weight per 100 parts by weight of the glass-reinforced fluoropolymer composition.

16 Claims, 1 Drawing Sheet

(56) References Cited

FOREIGN PATENT DOCUMENTS

WO    2015002251 A1    1/2015
WO    2019013934 A1    1/2019

OTHER PUBLICATIONS

English language abstract and machine-assisted English translation for JP 2009-252719 extracted from espacenet.com database on Feb. 1, 2021, 19 pages.

English language abstract and machine-assisted English translation for JP 2012-112448 extracted from espacenet.com database on Feb. 1, 2021, 10 pages.

English language abstract and machine-assisted English translation for JP 2014-224249 extracted from espacenet.com database on Feb. 1, 2021, 21 pages.

English language abstract for WO 2008/0104470 and machine-assisted English translation for equivalent JP 2008-026576 extracted from espacenet.com database on Feb. 1, 2021, 12 pages.

English language abstract for WO 2012/070401 extracted from espacenet.com database on Feb. 1, 2021, 2 pages.

English language abstract for WO 2014/189017 extracted from espacenet.com database on Feb. 1, 2021, 2 pages.

English language abstract for WO 2015/002251 extracted from espacenet.com database on Feb. 1, 2021, 2 pages.

\* cited by examiner

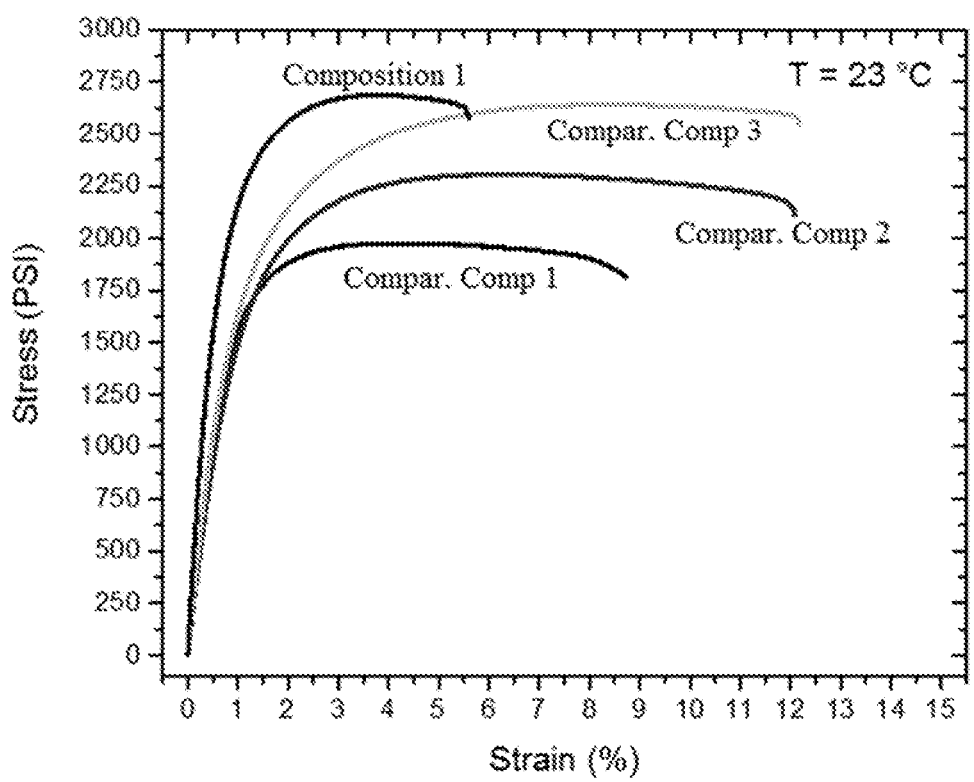

GLASS-REINFORCED FLUOROPOLYMER COMPOSITIONS

CROSS REFERENCE TO RELATED APPLICATIONS

This application is the National Stage of International Application No. PCT/US2019/042761, filed Jul. 22, 2019, which claims the benefit of and priority to U.S. Provisional Patent Application Ser. No. 62/701,952, filed Jul. 23, 2018, which are incorporated herein by this reference in their entirety.

FIELD OF THE DISCLOSURE

This disclosure generally relates to a glass-reinforced fluoropolymer composition. More specifically, this disclosure relates to a composition that includes a first fluoropolymer, a particular second fluoropolymer, and glass fibers. The composition exhibits increased flexural strength when compared to a comparative composition that is free of the second fluoropolymer.

BACKGROUND

Fluoropolymers such as polytetrafluoroethylene, tetrafluoroethylene/perfluoro(alkyl vinyl ether) copolymers and ethylene/tetrafluoroethylene copolymers, to name a few, are used in various fields such as semiconductor industry and automobile industry. Fluoropolymers have excellent heat resistance, chemical resistance, weather resistance, gas barrier properties, etc., but their adhesion to many substrates is inadequate. For example, in order to bond to various materials such as synthetic resins, metals, metal oxides, glass, ceramics, etc., it is common to employ a method wherein the surface of the fluoropolymers is subjected to corona discharge treatment or sodium etching treatment, and then an adhesive is applied for bonding. Such a bonding method has drawbacks such that the process is cumbersome and the productivity is low. In still other applications, the materials are pretreated with various chemistries which is not only expensive, but adds to production times and complexities.

In addition, fluoropolymers that are reinforced with glass are known in the art and include glass fibers that are surface treated to enhance adhesion to the fluoropolymers. However, due to the chemical nature of the fluoropolymers, there are limited commercially available options for treating the surface of the glass fibers. Typically, the glass fibers are surface treated with silanes or silane-based chemistries. These surface treatments must typically be done inside a manufacturing plant and be customized to match particular chemistries. Moreover, use of these surface treatments typically increases the number and complexity of the manufacturing process steps, thereby increasing costs and cycle times. Accordingly, there remains an opportunity for improvement.

BRIEF DESCRIPTION OF THE FIGURES

Other advantages of the present disclosure will be readily appreciated, as the same becomes better understood by reference to the following detailed description when considered in connection with the accompanying drawings wherein:

FIG. 1 is a line graph of stress (PSI) as a function of strain (%) at 23° C. of Composition 1 and Comparative Compositions 1-3, as set forth in the Examples.

SUMMARY OF THE DISCLOSURE

This disclosure provides a glass-reinforced fluoropolymer composition. The glass-reinforced fluoropolymer composition has increased flexural strength and includes a first fluoropolymer, a second fluoropolymer, and glass fibers. The first fluoropolymer is present in an amount of from 60 to 99 parts by weight per 100 parts by weight of the glass-reinforced fluoropolymer composition. The second fluoropolymer is chosen from (1) a carboxy- and/or anhydride-functionalized perfluoroalkoxy copolymer, (2) a carboxy- and/or anhydride-functionalized poly(ethylene-co-tetrafluoroethylene) copolymer, and (3) combinations thereof. The second fluoropolymer is present in an amount of from 0.5 to 39.5 parts by weight per 100 parts by weight of the glass-reinforced fluoropolymer composition. The glass fibers are present in an amount of from 0.5 to 39.5 parts by weight per 100 parts by weight of the glass-reinforced fluoropolymer composition.

DETAILED DESCRIPTION OF THE DISCLOSURE

This disclosure provides a glass-reinforced fluoropolymer composition, hereinafter described as the "composition." The composition may be used in any industry including, but not limited to, fuel hoses for automobiles, fuel tanks for automobiles, industrial hoses and tanks, hoses for food products, weather resistant films, chemical resistant linings, etc. Moreover, the composition may be used in applications that require one or more properties such as chemical resistance, high electric insulation, weather resistance, flame retardancy, low dielectric constants, water and oil repellency, high barrier properties, anti-stick properties, and/or high thermal resistance, or combinations thereof.

First Fluoropolymer:

The first fluoropolymer may be any known in the art. For example, the first fluoropolymer may be chosen from PFA (perfluoroalkoxy polymer); FEP (fluorinated ethylene propylene); PTFE (poly(tetrafluoroethylene)); PVDF (polyvinylidene fluoride); PVF (polyvinylfluoride); ETFE (poly (ethylene-co-tetrafluorethylene)); ECTFE (poly(ethylene-co-chlorotrifluoroethylene)); PCTFE (Polychlorotrifluoroethylene); FFKM (perfluoroelastomer); FKM (chlorotrifluoroethylene vinylidenefluoride); and combinations thereof. In one embodiment, the first fluoropolymer is chosen from a perfluoroalkoxy polymer, poly(ethylene-co-tetrafluoroethylene), polyvinylidene fluoride, fluorinated ethylene propylene, and combinations thereof. In other embodiments, all of these fluoropolymers are contemplated for use individually to the exclusion of one or more of the others. In still other embodiments, the first fluoropolymer is any one of the aforementioned polymers or is chosen from PFA, ETFE, PVDF, and FEP, and combinations thereof. It is also contemplated the co-polymers of any two or more of the aforementioned polymers may also be utilized.

The first fluoropolymer is present in an amount of from 60 to 99 parts by weight per 100 parts by weight of the composition. In various embodiments, the first fluoropolymer is present in an amount of from 65 to 95, from 70 to 90, from 75 to 85, from 80 to 85, from 80 to 90, from 85 to 95, from 80 to 95, or from 85 to 99, parts by weight per 100 parts by weight of the composition. In alternative embodiments, all values and ranges of values between the aforementioned values are hereby expressly contemplated.

Second Fluoropolymer:

The composition also includes a second fluoropolymer. The second fluoropolymer is different from the first fluoropolymer described above. The second fluoropolymer is present in an amount of from 0.5 to 39.5 parts by weight per 100 parts by weight of the composition. In various embodiments, the second fluoropolymer is present in an amount of from 5 to 39.5, 5 to 35, 10 to 30, 15 to 25, or 20 to 25, parts by weight per 100 parts by weight of the composition. In other embodiments, the second fluoropolymer is present in an amount of from 5 to 20, 5 to 15, 5 to 10, 10 to 20, 10 to 15, 15 to 20, or 5 to 20, parts by weight per 100 parts by weight of the composition. In various non-limiting embodiments, all values and ranges of values between and including the aforementioned values are hereby expressly contemplated.

In various embodiments, the melting point of the second fluoropolymer is from 150 to 320° C., e.g. from 200 to 310° C. When the melting point is within this range, the second fluoropolymer is excellent in the melt co-extrudability. The melting point can be adjusted by selecting the proportion of the components used to form the second fluoropolymer, e.g. those described below. In various non-limiting embodiments, all values and ranges of values between and including the aforementioned values are hereby expressly contemplated.

The volume flow rate (hereinafter referred to as the value Q) of the second fluoropolymer can be from 0.1 to 1,000 mm$^3$/sec. The value Q is an index showing the melt fluidity of the second fluoropolymer and is typically an indication of the molecular weight. Larger values of Q tend to correlated to lower molecular weights of the second fluoropolymer. Smaller values of Q tend to correlated to higher molecular weights of the second fluoropolymer. The value Q herein may represent the extrusion rate of the second fluoropolymer when it is extruded through an orifice having a diameter of 2.1 mm and a length of 8 mm under a load of 7 kg at a temperature higher by 50° C. than the melting point of the second fluoropolymer, by using a Flowtester by Shimadzu Corporation. If the value Q is too small, forming by extrusion tends to be difficult, and if it is too large, the mechanical strength of the second fluoropolymer tends to deteriorate. The value Q of the second fluoropolymer of the present invention can be from 5 to 500 mm$^3$/sec, e.g. from 10 to 200 mm$^3$/sec. In still other non-limiting embodiments, the second fluoropolymer may be as described in U.S. Pat. No. 7,112,640, which is expressly incorporated herein by reference in its entirety in these embodiments. In various non-limiting embodiments, all values and ranges of values between and including the aforementioned values are hereby expressly contemplated.

The second fluoropolymer is chosen from a carboxy- and/or anhydride-functionalized perfluoroalkoxy copolymer, a carboxy- and/or anhydride-functionalized poly(ethylene-co-tetrafluoroethylene) copolymer, and combinations thereof. In other words, the second fluoropolymer may be a carboxy-functionalized perfluoroalkoxy copolymer, an anhydride-functionalized perfluoroalkoxy copolymer, a carboxy-functionalized poly(ethylene-co-tetrafluoroethylene) copolymer, an anhydride-functionalized poly(ethylene-co-tetrafluoroethylene) copolymer, or combinations of two or more of these copolymers.

The second fluoropolymer may be carboxy- and/or anhydride-functionalized depending on reaction with glass fibers, as further described below. For example, some glass fibers have —OH groups extending from a surface of the glass fibers. Upon combination, one or more anhydride groups of the poly(ethylene-co-tetrafluoroethylene) and/or the perfluoroalkoxy copolymer may react with one or more of the —OH groups. If this occurs, a carboxy group is typically formed at one end of the copolymer and an ester is typically formed at the other end. Therefore, the second fluoropolymer may be carboxy- and/or anhydride-functionalized, depending on which molecule is being described and depending on a reaction, if any, with any —OH groups, e.g. on the glass fibers.

Functionalized Perfluoroalkoxy Copolymer:

The second fluoropolymer may be, include, consist essentially of, or consist of the carboxy- and/or anhydride-functionalized perfluoroalkoxy copolymer. The terminology "consists essentially of" describes embodiments wherein the second fluoropolymer is free of other polymers, e.g. other fluoropolymers, and/or free of additives known in the art.

In various embodiments, the second fluoropolymer includes repeating units (a) based on tetrafluoroethylene (hereinafter referred to as TFE) and/or chlorotrifluoroethylene (hereinafter referred to as CTFE), repeating units (b) based on a cyclic hydrocarbon monomer having a dicarboxylic anhydride group and an endocyclic polymerizable unsaturated group, and a repeating units (c) based on other monomer (excluding TFE, CTFE and the cyclic hydrocarbon monomer). The terminology "based on" describes that the units, after polymerization, may no longer be TFE, for example, but may be units that are formed from TFE. In other words, the chemical structure of the units, after polymerization, may be the structure that those of skill in the art would appreciate exists after polymerization occurs.

For example, the repeating units (a) may be present in an amount of from 50 to 99.89 mol %, the repeating units (b) may be present in an amount of from 0.01 to 5 mol %, and the repeating units (c) may be present in an amount of from 0.1 to 49.99 mol %, based on the total molar amount of the repeating units (a), (b) and (c). In various embodiments, the repeating units (a) may be present in an amount of from 50 to 99.47 mol %, the repeating units (b) may be present in an amount of from 0.03 to 3 mol %, and the repeating units (c) may be present in an amount of from 0.5 to 49.97 mol %. In still other embodiments, the repeating units (a) may be present in an amount of from 50 to 98.95 mol %, the repeating units (b) may be present in an amount of from 0.05 to 2 mol %, and the repeating units (c) may be present in an amount of from 1 to 49.95 mol %. In various non-limiting embodiments, all values and ranges of values between and including the aforementioned values are hereby expressly contemplated.

The cyclic hydrocarbon monomer having a dicarboxylic anhydride group and an endocyclic polymerizable unsaturated group (hereinafter referred to simply as a cyclic hydrocarbon monomer) is typically a polymerizable compound which is a cyclic hydrocarbon including at least one 5-membered ring or one 6-membered ring and which has a dicarboxylic anhydride group and an endocyclic polymerizable unsaturated group. As the cyclic hydrocarbon, a cyclic hydrocarbon having at least one bridged polycyclic hydrocarbon is most typical. In various embodiments, a cyclic hydrocarbon having such a bridged polycyclic hydrocarbon, a cyclic hydrocarbon having at least two bridged polycyclic hydrocarbons condensed, or a cyclic hydrocarbon having a bridged polycyclic hydrocarbon condensed with another cyclic hydrocarbon, is utilized. Further, this cyclic hydrocarbon monomer may have at least one endocyclic polymerizable unsaturated group, i.e. at least one polymerizable unsaturated group present among carbon atoms constituting the hydrocarbon ring. This cyclic hydrocarbon monomer further typically has a dicarboxylic anhydride group (—CO—O—CO—), and the dicarboxylic anhydride group may be bonded to two carbon atoms constituting the hydrocarbon ring or may be bonded to two carbon atoms outside the ring. In some embodiments, the dicarboxylic anhydride group is bonded to two carbon atoms which are carbon atoms constituting the ring of the above cyclic hydrocarbon and which are adjacent to each other. Further, to the carbon atoms constituting the ring of the cyclic hydrocarbon, instead of hydrogen atoms, halogen atoms, alkyl groups, halogenated alkyl groups or other substituents may be bonded.

In various examples, the structures represented below are utilized. In the formulae (2) and (5) to (8), R is a $C_{1-6}$ alkyl group, a halogen atom chosen from a fluorine atom, a chlorine atom, a bromine atom and an iodine atom, or a halogenated alkyl group having hydrogen atoms in the alkyl group substituted by halogen atoms. In other embodiments, 5-norbornene-2,3-dicarboxylic anhydride represented may be utilized and/or cyclic hydrocarbon monomers of the formulae (2) and (5) to (8), wherein R is a methyl group.

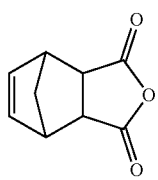
(1)

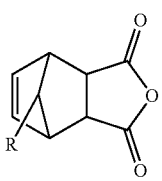
(2)

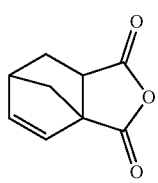
(3)

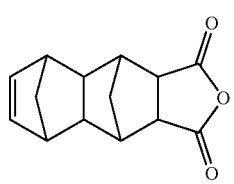
(4)

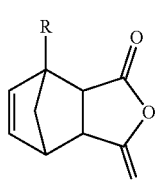
(5)

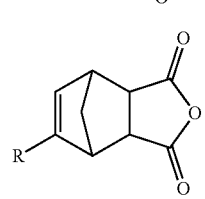
(6)

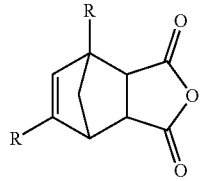
(7)

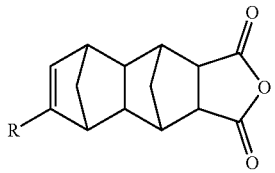
(8)

The cyclic hydrocarbon monomers of the above formulae (1) to (8) are compounds that can be produced by, for example, a method of heating cyclopentadiene and maleic anhydride in the absence of a catalyst or a method disclosed in JP-A-6-73043.

In non-limiting embodiments, the second fluoropolymer may be as described in U.S. Pat. No. 7,112,640, which is expressly incorporated herein by reference in its entirety in these embodiments.

Referring now to the (c) other monomers, these other monomers may be, include, consist essentially of, or consist of, vinyl fluoride, vinylidene fluoride (hereinafter referred to as VdF), trifluoroethylene, hexafluoropropylene (hereinafter referred to HFP), $CF_2$=$CFOR^{f1}$ (wherein $R^{f1}$ is a $C_{1-10}$ perfluoroalkyl group which may contain an oxygen atom between carbon atoms), $CF_2$=$CFOR^{f2}SO_2X^1$ (wherein $R^{f2}$ is a $C_{1-10}$ perfluoroalkylene group which may contain an oxygen atom between carbon atoms, and $X^1$ is a halogen atom or a hydroxyl group), $CF_2$=$CFOR^{f2}CO_2X^2$ (wherein $R^{f2}$ is as defined above, and $X^2$ is a hydrogen atom or a $C_{1-3}$ alkyl group), $CF_2$=$CF(CF_2)_pOCF$=$CF_2$ (wherein p is 1 or 2), $CH_2$=$CX^3(CF_2)_qX^4$ (wherein each of $X^3$ and $X^4$ which are independent of each other, is a hydrogen atom or a fluorine atom, and q is an integer of from 2 to 10), perfluoro (2-methylene-4-methyl-1,3-dioxolane), a $C_{2-4}$ olefin such as ethylene, propylene or isobutene, a vinyl ester such as vinyl acetate, and a vinyl ether such as ethyl vinyl ether or cyclohexyl vinyl ether, may, for example, be mentioned. Such other monomers may be used alone, or two or more of them may be used in combination. $CF_2$=$CFOR^{f1}$ may, for example, be $CF_2$=$CFOCF_2CF_3$, $CF_2$=$CFOCF_2CF_2CF_3$, $CF_2$=$CFOCF_2CF_2CF_2CF_3$, or $CF_2$=$CFO(CF_2)_8F$. It is preferably $CF_2$=$CFOCF_2CF_2CF_3$.

$CH_2$=$CX^3(CF_2)_qX^4$ may, for example, be $CH_2$=$CH(CF_2)_2F$, $CH_2$=$CH(CF_2)_3F$, $CH_2$=$CH(CF_2)_4F$, $CH_2$=$CF(CF_2)_3H$, or $CH_2$=$CF(CF_2)_4H$. It is preferably $CH_2$=$CH(CF_2)_4F$ or $CH_2$=$CH(CF_2)_2F$.

In other embodiments, (c) is chosen from VdF, HFP, $CF_2$=$CFOR^{f1}$, $CH_2$=$CX^3(CF_2)_qX^4$, ethylene, propylene and vinyl acetate, and more preferred is at least one member chosen from HFP, $CF_2$=$CFOR^{f1}$, ethylene and $CH_2$=$CX^3(CF_2)_qX^4$. Most preferred is HFP or $CF_2$=$CFOR^{f1}$.

In other embodiments, the second fluoropolymer is formed using the components set forth below wherein (a), (b), and (c), may be any described above.

|   |   | Embodiment 1 | Embodiment 2 | Embodiment 3 |
|---|---|---|---|---|
| (a) | Tetrafluoroethylene | 50-99.89 mol % | 50-99.47 mol % | 50-98.95 mol % |
| (b) | Anhydride | 0.01-5 mol % | 0.03-3 mol % | 0.05-2 mol % |
| (c) | Perfluoropropylvinylether | 0.1-49.99 mol % | 0.5-49.97 mol % | 1-49.95 mol % |

In various non-limiting embodiments, all values and ranges of values between and including the aforementioned values are hereby expressly contemplated.

Functionalized Poly(Ethylene-Co-Tetrafluoroethylene) Copolymer:

In various embodiments, the second fluoropolymer is, includes, consists essentially of, or consists of the carboxy- and/or anhydride-functionalized poly(ethylene-co-tetrafluoroethylene) copolymer. The carboxy- and/or anhydride-functionalized poly(ethylene-co-tetrafluoroethylene) copolymer may include units of tetrafluoroethylene and ethylene, and carboxylic acid groups. This copolymer may be further defined as a poly(ethylene-co-tetrafluoroethylene) copolymer that is functionalized with, or grafted with, a carboxy or anhydride. The terminology "consists essentially of" describes embodiments wherein the second fluoropolymer is free of other polymers, e.g. other fluoropolymers, and/or free of additives known in the art.

For example, second fluoropolymer may include units (a) that may be or may be based on tetrafluoroethylene (known as TFE), units (b) that may be or may be based on ethylene, units (c) based on a monomer such as a ter-monomer, and units (d) based on a carboxy or anhydride, e.g. a monomer having a dicarboxylic anhydride group. In various embodiments, the ratios and amounts of (a), (b), (c), and (d) are set forth below:

|   |   | Embodiment 1 | Embodiment 2 | Embodiment 3 |
|---|---|---|---|---|
| (a) | Tetrafluoroethylene | 30/70-70/30 as mol ratio (A/B) | 45/55-65/35 as mol ratio (A/B) | 50/50-70/30 as mol ratio (A/B) |
| (b) | Ethylene | | | |
| (c) | Ter-monomer $CH_2=CH(CF_2)_2F$ | 0.01-20 0.02 mol % | 0.05-15 mol % | 0.1-10 0.2 mol % |
| (d) | Anhydride | 100-1000 ppm against Carbon amount of main chain | 200-800 ppm against Carbon amount of main chain | 250-600 ppm against Carbon amount of main chain |

|   |   | Embodiment 4 | Embodiment 5 | Embodiment 6 |
|---|---|---|---|---|
| (a) | Tetrafluoroethylene | 20/80-80/20 as mol ratio (A/B) | 50/50-70/30 as mol ratio (A/B) | Any Aforementioned Mol Ratio |
| (b) | Ethylene | | | |
| (c) | Ter-monomer $CH_2=CH(CF_2)_4F$ | 0.01-20 0.02 mol % | 0.1-15 0.2 mol % | 1-10 mol % |
| (d) | Anhydride | 1/10000-5/100 as mol ratio: C/(A + B) | 1/1000-5/100 as mol ratio: C/(A + B) | 3/2000-3/100 as mol ratio: C/(A + B) |

|   |   | Embodiment 7 |
|---|---|---|
| (a) | Tetrafluoroethylene | Any Aforementioned Mol Ratio |
| (b) | Ethylene | |
| (c) | Ter-monomer $CH_2=CF(CF_2)_3H$ | Any Aforementioned Mol Ratio |
| (d) | Anhydride | |

In various non-limiting embodiments, all values and ranges of values between and including the aforementioned values are hereby expressly contemplated.

The terminology "based on" describes that the units, after polymerization, may no longer be TFE or ethylene or the ter-monomer, or the anhydride, but may be units that are formed from TFE or ethylene or the ter-monomer, or the anhydride. In other words, the chemical structure of the units, after polymerization, may be the structure that those of skill in the art would appreciate exists after polymerization occurs.

The units (a) and (b) are known in the art. The units (c) may be of the type set forth above. In certain embodiments, units (c) include HFP, $CF_2=CFOR^{f1}$, $CH_2=CX^3(CF_2)_qX^4$. Specific examples of units (c) include, but are not limited to, $CH_2=CH(CF_2)_2F$, $CH_2=CH(CF_2)_3F$, $CH_2=CH(CF_2)_4F$, $CH_2=CF(CF_2)_3H$, or $CH_2=CF(CF_2)_4H$.

The units (d) may be, or may be formed from, maleic anhydride, itaconic anhydride, itaconic acid, citraconic anhydride, citraconic acid, crotonic anhydride, crotonic acid, bicyclo[2.2.1]hept-2-ene-5,6-dicarboxylic anhydride, bicyclo[2.2.1]hept-2-ene-5,6-dicarboxylic acid, an unsaturated carboxylic anhydride wherein the unsaturated group is acrylic acid, methacrylic acid, maleic acid, monomethyl maleate, or fumaric acid, or combinations thereof. In various embodiments, the anhydride is maleic anhydride or itaconic anhydride, or combinations thereof. Alternatively, the carboxylic acid groups and/or anhydride groups may be formed from itaconic anhydride, citraconic anhydride, and combinations thereof. In still other embodiments, the carboxylic acid groups and/or anhydride groups may be formed from itaconic acid anhydride, itaconic acid, citraconic acid anhydride, citraconic acid, and combinations thereof. In still other non-limiting embodiments, the second fluoropolymer may be as described in JP Patent Application 2004-277689, which is expressly incorporated herein by reference in its entirety in these embodiments.

The proportion of units (a), (b), (c), and (d) may be as follows:

The units (a) may be from 40 to 60 mole %, 30 to 70 mole %, or 20 to 80 mole %.

The units (b) may be from 30 to 50 mole %, 25 to 60 mole %, or 20 to 70 mole %.

The units (c) may be from 1 to 5 mole %, 0.5 to 10 mole %, or 0.1 to 20 mole %.

The units (d) may be from 0.2 to 0.8 mole %, 0.1 to 1 mole %, or 0.01 to 3 mole %.

In one embodiment, units (a) may be from 40 to 60 mole %, units (b) may be from 30 to 50 mole %, units (c) may be from 1 to 5 mole %, and units (d) may be from 0.2 to 0.8 mole %.

Additional Embodiments

In other embodiments, second fluoropolymer may include a molar ratio of (A) polymerized units based on tetrafluoroethylene (hereinafter referred to as TFE) to (B) polymerized units based on ethylene (hereinafter referred to as E), of from 20/80 to 80/20, typically from 50/50 to 70/30, and more typically 50/50 to 60/40. If the molar ratio of (A)/(B) is too small, the heat resistance, weather resistance, chemical resistance, gas barrier properties, fuel barrier properties, etc. may decrease, and if the molar ratio is too large, the mechanical strength, melt processability, etc. may decrease. In various non-limiting embodiments, all values and ranges of values between and including the aforementioned values are hereby expressly contemplated.

(C) polymerized units based on itaconic anhydride or citraconic anhydride may also be utilized such that the molar ratio of (C)/((A)+(B)) is from 1/10,000 to 5/100, typically from 5/10,000 to 3/100, more typically from 7/10,000 to 1/100. If the molar ratio is too small, the adhesive properties may decrease, and if it is too large, fuel barrier properties may decrease. Here, itaconic anhydride (IAN) and citraconic anhydride (CAN) may be partially hydrolyzed before polymerization. For example, IAN may be a mixture of IAN and itaconic acid, obtained by partial hydrolysis of IAN. Likewise, CAN may be a mixture of CAN and citraconic acid, obtained by partial hydrolysis of CAN. Further, a part of polymerized units based on IAN or CAN may be hydrolyzed after the polymerization. Such polymerized units formed by hydrolysis before or after polymerization may be regarded as a part of polymerized units (C). For example, the amount of polymerized units (C) typically represents the total amount of polymerized units based on IAN and polymerized units based on itaconic acid formed by partial hydrolysis of IAN. In various non-limiting embodiments, all values and ranges of values between and including the aforementioned values are hereby expressly contemplated.

If IAN or CAN is used, it may be unnecessary to use a special polymerization method which is typically required in a case where maleic anhydride is employed. For example, in various embodiments, it is preferred that an ethylene/tetrafluoroethyl-ene copolymer having polymerized units based on acid anhydride can be obtained without using a perfluorocarboxylic acid or without copolymerizing hexafluoropropylene.

In addition to the polymerized units based on the above (A), (B) and (C), the second fluoropolymer may include (D) polymerized units based on another monomer other than (A), (B) and (C). Such other monomers may, for example, be a hydrocarbon olefin such as propylene or butene, a compound of the formula $CH_2=CX(CF_2)_nY$ (wherein each of X and Y which are independent of each other, is a hydrogen atom or a fluorine atom, and n is an integer of from 2 to 8), a fluoroolefin having hydrogen atoms on an unsaturated group, such as vinylidene fluoride, vinyl fluoride or trifluoroethylene, a fluoroolefin having no hydrogen atom on an unsaturated group, such as hexafluoropropylene, chlorotrifluoroethylene or a perfluoro(alkyl vinyl ether) (except for TFE), a vinyl ether such as an alkyl vinyl ether, a (fluoroalkyl) vinyl ether, glycidyl vinyl ether, hydroxybutyl vinyl ether or methyl vinyloxybutyl carbonate, a vinyl ester such as vinyl acetate (VAC), vinyl chloroacetate, vinyl butanoate, vinyl pivalate, vinyl benzoate or vinyl crotonate, or a (meth)acrylate such as a (polyfluoroalkyl) acrylate or a (polyfluoroalkyl) methacrylate. Such another monomer may be used alone or in combination of two or more of them.

In various embodiments, a compound represented by the above $CH_2=CX(CF_2)_nY$ is preferred. In other embodiments, a more preferred compound is one wherein n is from 2 to 4. In still other embodiments, the compound may be $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$, or $CH_2=CH(CF_2)_4H$. It is more typically $CH_2=CF(CF_2)_2F$, $CH_2=CH(CF_2)_2F$, $CH_2=CH(CF_2)_2H$ or $CH_2=CF(CF_2)_2H$, and most typically $CH_2=CH(CF_2)_2F$.

In other embodiments, a vinyl ester is also preferred. If polymerized units based on a vinyl ester are utilized, the fluorocopolymer may have excellent in the adhesive properties. In various embodiments, the vinyl ester is more typically VAC, vinyl chloroacetate, vinyl butanoate or vinyl pivalate, and most typically VAC.

In one embodiment wherein the fluorocopolymer includes (D) polymerized units based on the aforementioned other monomers, the content is typically from 0.01 to 20 mol %, more typically from 0.1 to 15 mol %, most typically from 1 to 10 mol %, based on the total polymerized units in the second fluoropolymer. In various non-limiting embodiments, all values and ranges of values between and including the aforementioned values are hereby expressly contemplated.

In other embodiments, it is preferred to have, as a terminal group of the second fluoropolymer, a functional group reactive with a non-fluorinated polymer such as a polyamide, such as an ester group, a carbonate group, a hydroxyl group, a carboxyl group or a carbonyl fluoride group. In various embodiments, it is preferred to introduce such a terminal group by properly selecting a radical polymerization initiator, a chain transfer agent or the like, to be used for the production of the second fluoropolymer. In still other non-limiting embodiments, the second fluoropolymer may be as described in U.S. Pat. Pub. No. 2003/0162923, which is expressly incorporated herein by reference in its entirety in these embodiments.

Glass Fibers:

The composition also includes glass fibers present in an amount of from 0.5 to 39.5 parts by weight per 100 parts by weight of the composition. In various embodiments, the glass fibers are present in an amount of from 1 to 39.5, 5 to 35, 10 to 30, 15 to 25, 20 to 25, 15 to 35, 20 to 30, or 25 to 30, parts by weight per 100 parts by weight of the composition. In various non-limiting embodiments, all values and ranges of values between and including the aforementioned values are hereby expressly contemplated.

The type, diameter, length, and bulk density of the glass fibers is not limited. In various embodiments, the glass fibers have a diameter of from 5 to 20, 5 to 15, 5 to 10, 10 to 20, 10 to 15, 15 to 20, 8 to 15, 9 to 14, 10 to 13, 11 to 12, 6 to 14, 7 to 13, 8 to 12, 9 to 11, or 9 to 10, microns. In other embodiments, the glass fibers have a length of from 5 to 100, 10 to 95, 15 to 90, 20 to 85, 25 to 80, 30 to 75, 35 to 70, 40 to 65, 45 to 60, 50 to 55, 15 to 85, 20 to 80, 25 to 75, 30 to 70, 35 to 65, 40 to 60, or 45 to 55, 3 to 15, 4 to 14, 5 to 13, 6 to 12, 7 to 11, 8 to 10, or 9 to 10, microns. In still other embodiments, the glass fibers have a bulk density of from 0.5 to 1.5, 0.5 to 1, 1 to 1.5, 0.6 to 1, 0.7 to 0.9, or 0.8 to 0.9, g/ml. In various embodiments, the glass fibers are milled glass fibers having a diameter of from 8 to 15 microns, a length of from 15 to 85 microns, and a bulk density of from 0.6 to 1 g/ml. In other embodiments, the glass fibers are chopped glass fibers having a diameter of from 6 to 14 microns and a length of from 3 to 15 microns. In various non-limiting embodiments, all values and ranges of values between and including the aforementioned values are hereby expressly contemplated.

The glass fibers can be chopped or not-chopped, milled or not-milled, present as a mat or as one of more individual fibers. Glass fibers are typically formed when thin strands of silica-based or other formulations are extruded into many fibers. The glass fibers may be fiberglass, E-glass (i.e., alumino-borosilicate glass with less than 1% w/w alkali oxides), A-glass (i.e., alkali-lime glass with little or no boron oxide), E-CR-glass (i.e., electrical/chemical resistant glass that is typically alumino-lime silicate glass with less than 1% w/w alkali oxides and with high acid resistance), C-glass (i.e., alkali-lime glass with high boron oxide content), D-glass (i.e., borosilicate glass with a low di-electric constant), R-glass (i.e., alumino silicate glass without MgO and CaO), S-glass (i.e., alumino silicate glass without CaO but with high MgO content), and combinations thereof. Alternatively, the glass fibers may be pure silica (silicon dioxide) which may be cooled to form fused quartz.

The glass fibers may be treated or untreated. For example, the glass fibers may be treated with one or more of silane, cationic, or epoxy resins, or via hydrofluoric acid etching or sandblasting. Alternatively, the glass fibers may be untreated. For example, the glass fibers may be free of silane or any one or more of the aforementioned treatments.

Physical Properties:

The composition typically has one or more physical properties that are improved when compared to a comparative composition that is free of the second fluoropolymer. In other words, the physical properties of the instant composition may be calculated and then compared to the physical properties of a comparative composition that is the same as the instant composition being tested except for the presence of the second fluoropolymer. When such comparisons are made, one or more of the physical properties of the instant composition are typically improved/better than those of the comparative composition.

In various embodiments, the composition has a flexural strength that is from 15 to 40, 20 to 35, 25 to 30, 30 to 35, 25 to 40, 25 to 35, or 35 to 40, percent greater than a comparative composition that is free of the second fluoropolymer, as determined using ASTM D790-10. In other embodiments, the composition has a flexural modulus that is from 25 to 60, 30 to 55, 35 to 50, 40 to 45, 45 to 50, 35 to 60, 40 to 55, or 45 to 50, percent greater than a comparative composition that is free of the second fluoropolymer, as determined using ASTM D790-10. In further embodiment, the composition has a compressive strength that is from 10 to 25, 15 to 20, 20 to 25, or 15 to 25, percent greater than a comparative composition that is free of the second fluoropolymer, as determined using ASTM D95-10. In still further embodiments, the composition has a compressive modulus that is from 40 to 70, 45 to 65, 50 to 65, 50 to 55, 55 to 60, 50 to 70, 55 to 65, or 60 to 65, percent greater than a comparative composition that is free of the second fluoropolymer, as determined using ASTM D95-10. In addition embodiments, the composition has a tensile modulus that is from 80 to 125, 85 to 120, 90 to 115, 95 to 105, 95 to 100, 100 to 105, 90 to 125, 95 to 115, 100 to 110, 100 to 105, or 105 to 110, percent greater than a comparative composition that is free of the second fluoropolymer, as determined using ASTM D638-10. In various non-limiting embodiments, all values and ranges of values between and including the aforementioned values are hereby expressly contemplated.

Method of Forming the Composition:

This disclosure also provides a method of forming the composition. The method includes the steps of forming a melt stream of the first fluoropolymer, mixing the glass fibers and the second fluoropolymer to form a mixture, and adding the mixture to the melt stream to form the glass-reinforced fluoropolymer composition. Any one of more of these steps may be completed as would be understood or chosen by one of skill in the art. For example, times, heats, pressures, etc. may be chosen by one of skill in the art.

Examples

A composition representative of this disclosure (Composition 1) is formed along with three comparative compositions (Comparative Compositions 1-3). The Compositions are set forth in Table 1 below.

More specifically, Composition 1 is formed by combining the glass fibers and the second fluoropolymer by a simple tumbling method, as would be appreciated by one of skill in the art. This mixture is then added to a melt stream of PFA, as would also be appreciated by one of skill in the art via an extrusion compounding method.

Comparative Compositions 1-3 are formed by adding the glass fiber direction to a melt stream of the PFA. The glass fiber is mixed into the melt stream by a twin-screw extruder and the resulting extrudate is pelletized for testing.

After formation, each of the Compositions is evaluated to determine mean values for strength at break, elongation at break, Young's Modulus, flexural strength, flexural modulus, compressive strength, and compressive modulus, also set forth in Table 1 below (wherein standard deviations are set forth in parentheses). Each of the Compositions is also evaluated to determine stress (PSI) as a function of strain (%) at 23° C. The results are set forth in FIG. 1.

TABLE 1

|  | Comp. 1 | Compar. Comp. 1 | Compar. Comp. 2 | Compar. Comp. 3 |
| --- | --- | --- | --- | --- |
| First Fluoropolymer | 65 | 75 | 75 | 75 |
| Second Fluoropolymer | 10 | — | — | — |
| Glass Fibers 1 | — | 25 | — | — |
| Glass Fibers 2 | 25 | — | 25 | — |
| Glass Fibers 3 | — | — | — | 25 |
| Strength at Break (PSI; 23° C.) | 2700 (19) | 1816 (61) | 2112 (30) | 2630 (16) |
| Strength at Break (PSI; 130° C.) | 1290 (19) | 926 (34) | 1056 (27) | 1240 (8) |
| Strength at Break (PSI; 150° C.) | 1102 (21) | 816 (17) | 918 (28) | 1120 (6) |
| Strength at Break (PSI; 200° C.) | 829 (12) | 677 (19) | 776 (12) | 813 (17) |
| Elongation at Break (%; 23° C.) | 5.1 (0.3) | 8.4 (1) | 11 (2) | 12 (0.5) |
| Elongation at Break (%; 130° C.) | 11 (2) | 21 (5) | 14 (5) | 28 (8) |

TABLE 1-continued

|  | Comp. 1 | Compar. Comp. 1 | Compar. Comp. 2 | Compar. Comp. 3 |
| --- | --- | --- | --- | --- |
| Elongation at Break (%; 150° C.) | 9 (1) | 21 (1) | 14 (2) | 23 (3) |
| Young's Modulus (KSI; 23° C.) | 416 (43) | 254 (15) | 204 (13) | 236 (11) |
| Young's Modulus (KSI; 130° C.) | 94.7 (2.9) | 98.8 (20.0) | 82.3 (9.8) | 41.0 (3.0) |
| Young's Modulus (KSI; 150° C.) | 70.9 (12.0) | 77.2 (8.3) | 56.0 (5.9) | 39.3 (6.1) |
| Flexural Strength (PSI; 23° C.) | 5150 (61) | 3900 (170) | 4060 (67) | 4410 (23) |
| Flexural Modulus (KSI; 23° C.) | 302 (9) | 236 (13) | 197 (7) | 198 (3) |
| Compressive Strength (PSI; 23° C.) | 4250 (150) | 3490 (74) | 3670 (52) | 3760 (210) |
| Compressive Modulus (KSI; 23° C.) | 270 (18) | 210 (6) | 168 (13) | 206 (18) |

The First Fluoropolymer is perfluoroalkoxy polymer (PFA) and more specifically P62X.

Second Fluoropolymer is EA-2000.

Glass Fibers 1 are glass fibers treated with a silane that has a fluorine containing organic group. The glass fibers are 739DC from Owens Corning and the silane is Dynasylan F8800.

Glass Fibers 2 are glass fibers that are untreated. The glass fibers are 739DC commercially available from Owens Corning.

Glass Fibers 3 are glass fibers treated with a silane that have a vinyl organic group. The glass fibers are PF E 001 and the silane is Momentive TSL8331.

Strength at Break is determined using ASTM D638-10.
Elongation at Break is determined using ASTM D638-10.
Young's Modulus is determined using ASTM D638-10.
Flexural Strength is determined using ASTM D790-10.
Flexural Modulus is determined using ASTM D790-10.
Compressive Strength is determined using ASTM D695-10
Compressive Modulus is determined using ASTM D695-10.

The data set forth above shows that the second fluoropolymer is highly compatible with the first fluoropolymer such that the glass fibers can be strongly incorporated and adhered within the composition thereby greatly enhancing the physical properties of the composition. The adhesive functional group of the second polymer strongly interacts and bonds to the glass fiber surface. Because the second polymer is similar to the first polymer, there is a high compatibility between the two materials; therefore, the glass fibers are closely incorporated into the overall matrix of the first polymer, which allows the first polymer take on more of the advantageous mechanical characteristics from the glass fiber and over a wider operational temperature range.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A glass-reinforced fluoropolymer composition having increased flexural strength and comprising:
   A. a first fluoropolymer present in an amount of from 60 to 99 parts by weight per 100 parts by weight of said glass-reinforced fluoropolymer composition;
   B. a second fluoropolymer defined as a carboxy- and/or anhydride-functionalized perfluoroalkoxy copolymer, wherein said second fluoropolymer is present in an amount of from 0.5 to 39.5 parts by weight per 100 parts by weight of said glass-reinforced fluoropolymer composition; and C. glass fibers having a diameter of from 5 to 20 microns and a length of 5 to 100 microns, with said glass fibers present in an amount of from 0.5 to 39.5 parts by weight per 100 parts by weight of said glass-reinforced fluoropolymer composition;

wherein said glass fibers are milled fibers, and wherein said carboxy- and/or anhydride-functionalized perfluoroalkoxy copolymer consists of units derived from:
(1) tetrafluoroethylene,
(2) a cyclic hydrocarbon monomer having a dicarboxylic anhydride group and a polymerizable unsaturated group, and
(3) a monomer selected from the group of:
  (a) $CF_2=CFOR^{f1}$, wherein $R^{f1}$ is a $C_{1-10}$ perfluoroalkyl group which may contain an oxygen atom between carbon atoms,
  (b) $CF_2=CFOR^{f2}SO_2X^1$, wherein $R^{f2}$ is a $C_{1-10}$ perfluoroalkylene group which may contain an oxygen atom between carbon atoms, and $X^1$ is a halogen atom or a hydroxyl group,
  (c) $CF_2=CFOR^{f2}CO_2X^2$, wherein $R^{f2}$ is as defined above, and $X^2$ is a hydrogen atom or a $C_{1-3}$ alkyl group,
  (d) $CF_2=CF(CF_2)_pOCF=CF_2$, wherein p is 1 or 2, and
  (e) combinations thereof.

2. The glass-reinforced fluoropolymer composition of claim 1 wherein said cyclic hydrocarbon monomer having a dicarboxylic anhydride group and a polymerizable unsaturated group is selected from itaconic anhydride, citraconic anhydride, and combinations thereof.

3. The glass-reinforced fluoropolymer composition of claim 1 wherein said second fluoropolymer is present in an amount of from 5 to 20 parts by weight per 100 parts by weight of said glass-reinforced fluoropolymer composition.

4. The glass-reinforced fluoropolymer composition of claim 3 wherein said glass fibers are present in an amount of from 15 to 35 parts by weight per 100 parts by weight of said glass-reinforced fluoropolymer composition.

5. The glass-reinforced fluoropolymer composition of claim 1 wherein said glass fibers have a bulk density of from 0.5 to 1.5 g/ml.

6. The glass-reinforced fluoropolymer composition of claim 4 wherein said glass fibers have a diameter of from 8 to 15 microns, a length of from 15 to 85 microns, and a bulk density of from 0.6 to 1 g/ml.

7. The glass-reinforced fluoropolymer composition of claim 1 wherein said first fluoropolymer is present in an amount of from 80 to 95 parts by weight per 100 parts by weight of said glass-reinforced fluoropolymer composition.

8. The glass-reinforced fluoropolymer composition of claim 1 wherein said first fluoropolymer is chosen from a perfluoroalkoxy polymer, poly(ethylene-co-tetrafluoroethylene), polyvinylidene fluoride, fluorinated ethylene propylene, and combinations thereof.

9. The glass-reinforced fluoropolymer composition of claim 1 wherein said glass fibers are untreated and optionally free of silane.

10. The glass-reinforced fluoropolymer composition of claim 1 having a flexural strength that is from 15 to 40 percent greater than a comparative composition that is free of said second fluoropolymer, as determined using ASTM D790-10.

11. The glass-reinforced fluoropolymer composition of claim 10 having a flexural modulus that is from 25 to 60 percent greater than a comparative composition that is free of said second fluoropolymer, as determined using ASTM D790-10.

12. The glass-reinforced fluoropolymer composition of claim 1 having a compressive strength that is from 10 to 25 percent greater than a comparative composition that is free of said second fluoropolymer, as determined using ASTM D95-10.

13. The glass-reinforced fluoropolymer composition of claim 12 having a compressive modulus that is from 40 to 70 percent greater than a comparative composition that is free of said second fluoropolymer, as determined using ASTM D95-10.

14. The glass-reinforced fluoropolymer composition of claim 1 having a tensile modulus that is from 80 to 125 percent greater than a comparative composition that is free of said second fluoropolymer, as determined using ASTM D638-10.

15. A method of forming a glass-reinforced fluoropolymer composition comprising the steps of:
forming a melt stream of a first fluoropolymer;
mixing glass fibers and a second fluoropolymer defined as a carboxy- and/or anhydride-functionalized perfluoroalkoxy copolymer to form a mixture; and
adding the mixture to the melt stream to form the glass-reinforced fluoropolymer composition;
wherein the glass-reinforced fluoropolymer composition includes the first fluoropolymer in an amount of from 60 to 99 parts by weight, the second fluoropolymer in an amount of from 0.5 to 39.5 parts by weight, and the glass fiber in an amount of from 0.5 to 39.5 parts by weight, each based on 100 parts by weight of the glass-reinforced fluoropolymer composition;
wherein the glass fibers have a diameter of from 5 to 20 microns and a length of 5 to 100 microns; and
wherein said glass fibers are milled fibers, and
wherein the carboxy- and/or anhydride-functionalized perfluoroalkoxy copolymer consists of units derived from:
(1) tetrafluoroethylene,
(2) a cyclic hydrocarbon monomer having a dicarboxylic anhydride group and a polymerizable unsaturated group, and
(3) a monomer selected from the group of:
  (a) $CF_2=CFOR^{f1}$, wherein $R^{f1}$ is a $C_{1-10}$ perfluoroalkyl group which may contain an oxygen atom between carbon atoms,
  (b) $CF_2=CFOR^{f2}SO_2X^1$, wherein $R^{f2}$ is a $C_{1-10}$ perfluoroalkylene group which may contain an oxygen atom between carbon atoms, and $X^1$ is a halogen atom or a hydroxyl group,
  (c) $CF_2=CFOR^{f2}CO_2X^2$, wherein $R^{f2}$ is as defined above, and $X^2$ is a hydrogen atom or a $C_{1-3}$ alkyl group,
  (d) $CF_2=CF(CF_2)_pOCF=CF_2$, wherein p is 1 or 2, and
  (e) combinations thereof.

16. The glass-reinforced fluoropolymer composition of claim 1 wherein said carboxy- and/or anhydride-functionalized perfluoroalkoxy copolymer consists of units derived from:
(1) tetrafluoroethylene,
(2) a cyclic hydrocarbon monomer having a dicarboxylic anhydride group and a polymerizable unsaturated group, and
(3) perfluoropropyl vinyl ether.

* * * * *